July 11, 1933.  F. P. FRANKFORD  1,918,025
BRAKE VALVE
Original Filed July 18, 1930
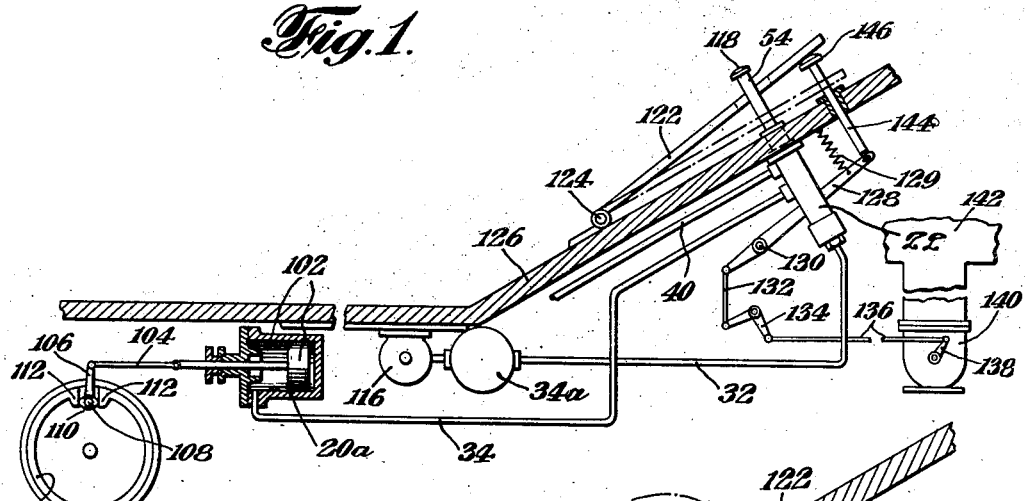
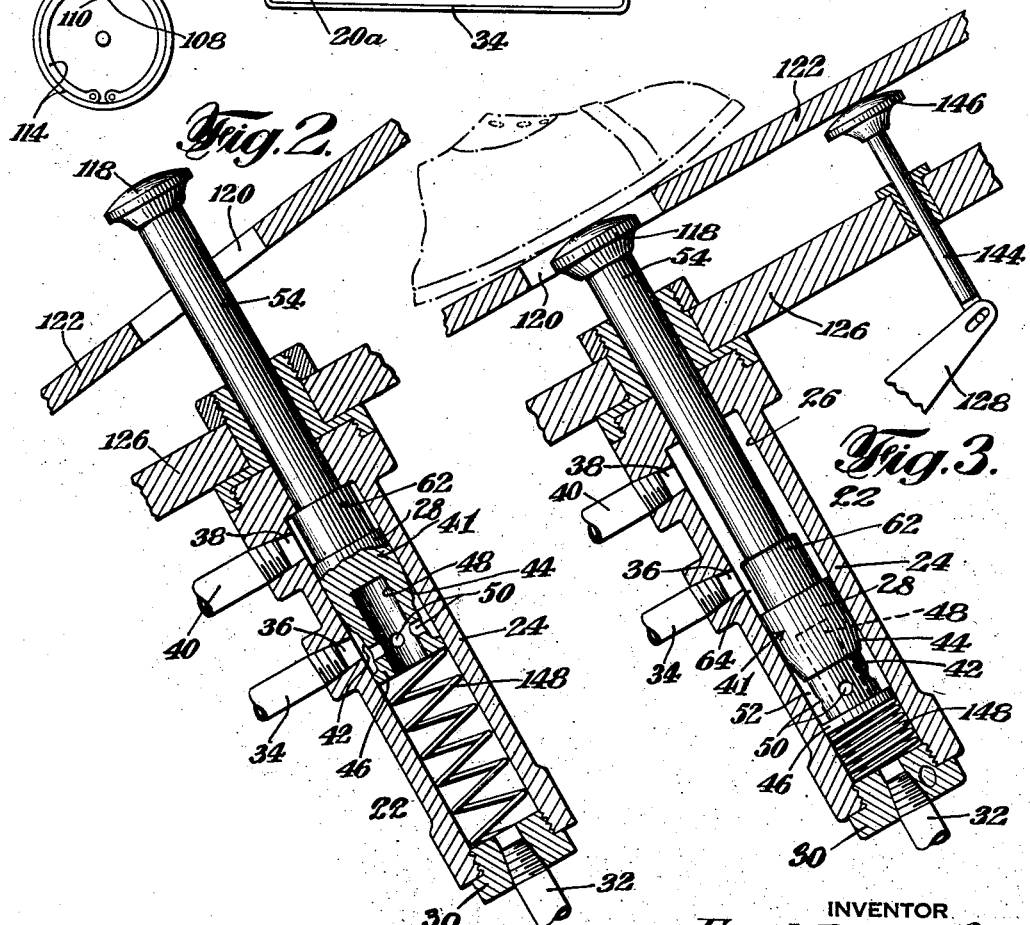
INVENTOR.
Frank P. Frankford
BY
ATTORNEYS Patented July 11, 1933

1,918,025

UNITED STATES PATENT OFFICE

FRANK P. FRANKFORD, OF RIDGEFIELD PARK, NEW JERSEY

BRAKE VALVE

Original application filed July 18, 1930, Serial No. 468,860. Divided and this application filed August 1, 1931. Serial No. 554,405.

This invention relates to control means for motor vehicles and is a division of my prior application Serial No. 468,860, filed July 18, 1930, which has been issued as Patent #1,847,338 dated March 1, 1932. The invention will be fully apparent from the following specification when read in connection with the accompanying drawing and will be defined with particularity in the appended claims.

In the drawing:—

Fig. 1 is a longitudinal section through a portion of a motor vehicle showing the application of the present invention thereto, the view also illustrating means combined with an air brake control for actuating the throttle control mechanism of the vehicle;

Fig. 2 is an enlarged longitudinal sectional view illustrating the position assumed by the parts shown in Fig. 1 upon application of the brake;

Fig. 3 is a view similar to Fig. 2 showing the parts in running position.

In the particular embodiment illustrated, the invention is applied to motor buses. I provide means whereby the throttle valve mechanism of the motor vehicle is coordinated with the brake control valve. In the drawing, 32 represents a pipe adapted to be connected with a suitable air reservoir 34ª charged by a compressor 116. A brake pipe 34 communicates with a brake cylinder 20ª within which operates a piston 102 which is connected by means of a link 104 with an arm 106 adapted to rock a shaft 108 carrying a cam 110 coacting with jaws 112. When air is supplied to the brake cylinder, the piston 102 will be moved to the left. This will rock the arm 106 clockwise and thereby expand the jaws 112, thus pressing the brake members against the interior surface of a brake drum 114.

The supply of air to the brake cylinder 20ª is controlled by a valve indicated as a whole at 22. This valve comprises a casing 24 having a longitudinally extending chamber 26 therein within which a valve plunger indicated as a whole at 28 operates. The lower end of chamber 26 is closed by a plug 30. Air is supplied to the valve chamber through pipe 32 which communicates with an air reservoir 34ª which may be charged by a suitable motor driven compressor.

Brake cylinder 20ª is connected by means of a pipe 34 and valve port 36 with the valve chamber 26. Spaced from the port 36 there is an exhaust port 38 having an exhaust pipe 40 connected therewith.

The plunger 28 includes a cylindrical portion 41 which is of substantially the same diameter as the chamber 26 so as to be freely slidable therein and yet not prevent the escape of any appreciable amount of air pressure. The cylindrical portion is joined to a neck portion 42 of reduced diameter by means of a graduating portion 44, whose diameter increases gradually from the neck portion to the cylindrical portion. At the lower extremity of the plunger, there is a ring portion 46 of substantially the same diameter as the chamber 26.

A cavity 48 extends a short distance longitudinally of the plunger and this cavity communicates by means of ports 50 with the annular space 52 surrounding the neck portion and graduating portion of the plunger.

The plunger includes an operating stem 54 which extends through the flooring 126 of the vehicle. Normally the operator holds his foot against the upper end 118 of the stem 54 so as to prevent passage of air from the reservoir 34ª to the port 36 communicating with the brake pipe 34. Thus, when the parts are in the running position of Fig. 3, there will be no supply of compressed air to the brake cylinder. In this position, a reduced portion 62 of the plunger will be opposite the brake pipe port 36. Thus air from the brake cylinder can be exhausted through pipe 34 into the space 64 between the portion 62 of the plunger and the wall of chamber 26 to the exhaust pipe 40 through port 38.

To apply the brakes, the operator gradually lifts his foot. This permits the air pressure to force the plunger upwardly toward the position illustrated in Fig. 2. During this movement, the gradually increasing parts of the graduating portion 44 of the plunger pass the port 36 and thereby permit a gradual application of the brakes, the air flowing from the reservoir 34ª through pipe 32, through cavity 48 and ports 50, to the port 36 and pipe 34 to the brake cylinder.

For an emergency application of the brakes, the operator quickly lifts his foot. This permits the air pressure to immediately force the plunger to the position of Fig. 2 so that the reduced neck portion 42 comes opposite the port 36 hence the inrush of fluid pressure gives an emergency application of the brakes. When the plunger is in brake application position, the cylindrical portion 41 of the plunger cuts off communication between the brake pipe supply port 36 and the exhaust port 38.

In normal operation, the operator keeps his foot on the head 118 secured to the upper end of the valve plunger stem 54. This stem projects through an opening 120 formed in a foot treadle or operating member 122 which is pivoted at 124 to a suitable bracket carried by the inclined floorboard 126 such as usually provided in front of the driver's seat of a motor bus.

The usual accelerator or throttle control lever 128 of the motor vehicle is pivoted at 130 and is connected through link 132, bell crank 134 and link 136 to the throttle lever 138 of the carbureter 140 for supplying gas to the motor, not shown, through a manifold 142. The lever 128 is connected to a rod 144 which projects through the floorboard 126 and has a head 146 on the end thereof which engages the underside of the operating member 122. As thus arranged, when the operator presses his foot against the member 122, he will depress the stem 54 of the valve plunger to the position of Fig. 3, thus cutting off the supply of air to the brake cylinder and at the same time opening communication from the brake cylinder to the exhaust port 40. At the same time, pressure on the member 122 will depress the head 146 and through the connections described will impart an opening movement to the throttle lever of the carbureter.

Releasing the foot pressure on the operating member 122 will permit the air pressure to lift the plunger through the opening 120. At the same time, a spring 129 attached to the member 128 will cause a closing movement of the gas throttle. Thus the brakes will be applied and the gas supply materially throttled down.

In the embodiment of the invention illustrated, it will be apparent that in order for the vehicle to move it is necessary for the operator to hold his foot against the plunger so as to maintain the brakes released. Upon disability or death of the operator, the muscular effort will cease and of course the brakes will be automatically applied and the supply of power to the vehicle simultaneously interrupted as will be understood.

While it is not essential to the operation of the device, I provide a light spring 148 between the lower end of the valve plunger and the plug 30. This serves as a yielding stop for the downward movement of the plunger, the spring being adapted to go practically solid upon the limit of downward movement of the plunger.

Various modifications may be made by those skilled in the art without departing from the invention as defined in the appended claims.

What I claim is:—

1. An apparatus of the class described comprising a brake cylinder having a fluid actuated piston therein, a source of fluid pressure, a valve casing having a chamber extending longitudinally thereof, a valve plunger movable axially of said chamber, a duct communicating with a source of fluid pressure and with one end of said chamber so that the pressure tends to press the plunger toward the opposite end thereof, respective ports in said chamber communicating with atmosphere and said brake cylinder, said plunger controlling communication between said source of fluid pressure and the port leading to the brake cylinder and also controlling communication between the latter port and the port leading to atmosphere, a manually operable member having an apertured portion through which said plunger is adapted to extend, and gas throttle actuating means coacting with said manually operable member.

2. Apparatus of the character described comprising a manually operated member having a cut-away portion, a gas throttle actuating means coacting with said member, a brake cylinder having a fluid actuated piston therein, a fluid pressure supply, valve means controlling communication of fluid pressure from said supply to said brake cylinder, said valve means including a movable element normally held by the air pressure from said supply in position to establish communication between said supply and said brake cylinder, said movable element having a part extending through the cut-away portion of said manually operable member and being adapted when depressed to be moved to a position to cut off communication between said fluid pressure supply and the brake cylinder.

3. An apparatus of the character described including a manually operable member having a cut-away portion, gas throttle actuating means coacting with said member, a fluid pressure supply, fluid operated brake actuating mechanism, valve means controlling communication between said fluid supply and said brake actuating mechanism, said valve means including an element having a part extending through the cut-away portion of said manually operable member, said valve element being normally impositively urged to position to establish communication between said pressure supply and said brake operating means and adapted when depressed to cut off the supply of fluid pressure to said brake operating means and to vent the operating means to atmosphere substantially as described.

In witness whereof, I have hereunto signed my name.

FRANK P. FRANKFORD.